July 26, 1966 R. B. JOHNSON ET AL 3,262,522
SUSPENSION MECHANISM Filed March 24, 1964 6 Sheets-Sheet 1

INVENTORS.
ROY B. JOHNSON
JOSEPH E. SCERBO
BY
Arthur J. Plantamura
ATTORNEY.

July 26, 1966  R. B. JOHNSON ETAL  3,262,522
SUSPENSION MECHANISM

Filed March 24, 1964  6 Sheets-Sheet 3

INVENTORS.
ROY B. JOHNSON
JOSEPH E. SCERBO
BY
*Arthur J. Plantamura*
ATTORNEY.

INVENTORS.
ROY B. JOHNSON
JOSEPH E. SCERBO
BY
Arthur J. Plantamura
ATTORNEY.

United States Patent Office 3,262,522
Patented July 26, 1966

3,262,522
SUSPENSION MECHANISM
Roy B. Johnson, York, Pa., and Joseph E. Scerbo, Stamford, Conn., assignors to American Machine & Foundry Company, a corporation of New Jersey
Filed Mar. 24, 1964, Ser. No. 354,376
12 Claims. (Cl. 188—130)

The present invention relates to a suspension system incorporating an actuator mechanism as well as a shock absorbing arrangement. In particular, the present invention relates to a novel suspension system for land vehicles that provides means for varying the road clearance under the vehicle and containing as well means in the system for absorbing road shock in a variety of adjustable vehicle ride hardnesses. In a more specific embodiment, the invention relates to a rotary vehicle actuator of this kind which incorporates in addition a shock absorber lock-out system thereby affording high relative rigidity to the vehicle when it is desired to convert the vehicle into a rigid platform, i.e., to eliminate, from the suspension, the spring or recoil normally associated with shock absorbing mechanisms.

In the arrangement comprising the invention, the shock absorber's function is to apply controlled friction damping to the vehicle torsion bar suspension system, i.e. by varying the degree of friction, the ride hardness may be varied. The absorber so constructed, provides a variable damping rate throughout a broad range of travel modes and terrains as is particularly adapted, for example, to increase the speed range of tracked vehicles.

In actual road tests of tracked vehicles, one side of the tracked vehicle appears to undergo a more severe ride than the other. This is caused by the driver, who tends to favor his side of the vehicle, and therefore, subjects the opposite side to a more severe ride. The same tests have indicated that particular wheel positions undergo a greater number of deflections per mile than other positions at various vehicle speeds. Based on the above, and on other observations and studies of vehicle performances, it is considered highly desirable that the shock absorber devices have provisions for:

(1) Ride Hardness Control, which is the ability to vary the torque preload of the friction disk assembly to achieve varying ride characteristics. To obtain a "soft" ride characteristic, low preload would be employed while to obtain a "hard" ride, preload is increased.

(2) Velocity Control, which is the ability to vary the damping characteristics as a function of road arm angular velocity. This provides more friction damping at higher angular velocities, regardless of the compressive position of the road arm.

(3) Displacement Control, which is the ability to vary the damping characteristics as a function of road arm angular displacement. This offers more friction damping with increasing road arm compression.

The rotary actuator component of the present invention enables the road arm assembly to be rotated with respect to the vehicle torsion bar, on demand, to vary the road clearance of the vehicle. This actuator comprises a hydraulic rotary vane actuator which incorporates an interference fit connection. This construction affords a fail-safe lock at any angle of rotation between 0° and 88°. The interference fit is located in a sleeve over the outer diameter of the actuator.

The rotary actuator includes two main assemblies; the inner body assembly which is connected to the main shaft, and the outer body assembly which is splined for connection to the torsion bar. By applying a hydraulic pressure to the inner body chambers, a force is developed between the vanes of the inner and outer body, causing rotation of the inner body and the main shaft, and thereby the arm connected to the road wheels thus elevating or lowering the vehicle hull. The interference fit sleeve located on the outer body assembly is keyed to the inner body assembly so that rotation can only take place when the lock is released by the introduction of fluid pressure at the interference fit interface, i.e. by introducing fluid under pressure between the sleeve and outer body assembly, thereby expanding the sleeve and providing a relatively free bearing surface. In an alternate and more specific embodiment, the inner body assembly is connected to a suspension lockout mechanism, an arrangement which functions when pressurized, to produce a lock by an interference coupling on the stationary main housing. Accordingly with both locks released, the unit is free to rotate and to variably position the road arm. The road arm position which is used to vary the road clearance is firmly locked, due to the interference fit coupling when no pressure is being exerted to uncouple the interference fit interface. Both the lock affording variable road clearance and the lock which permits rigidity to be imparted to the vehicle by locking out the shock absorber are designed to adequately resist the torsional loads imposed on the actuator.

It is a primary object of the invention to provide an actuator for a vehicle suspension system which incorporates a fail-locked variable position road clearance means coupled with a shock absorber which offers a variety of ride hardnesses.

It is a more specific object of the invention to provide a vehicle suspension actuator comprising an interference fit lockable rotary movement in combination with an adjustable shock absorber mechanism to produce maximum variation in road clearance positions and in shock absorption flexibility.

It is a further and an alternate object of the invention to provide a rotary actuator of this kind which includes, in addition, a shock absorber lockout for a vehicle or land traversing mechanism, thereby converting the vehicle to a relatively unyielding platform.

Other objects, advantages and capabilities provided by the invention will become apparent as the invention is described by the following detailed description taken in conjunction with the accompanying drawing wherein.

Figure 1:
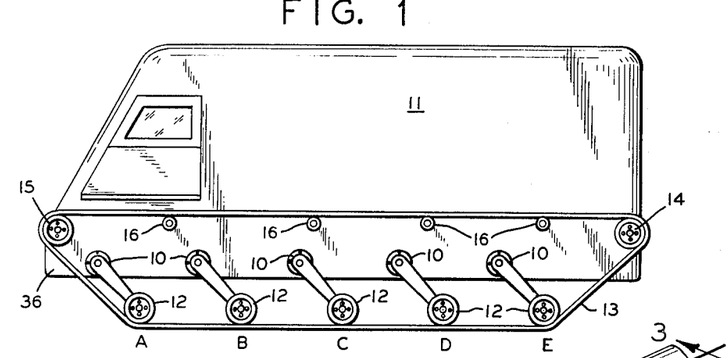
FIG. 1 is a side elevational schematic view illustrating the use of the actuator of the invention on a typical vehicle.

Referring particularly to the drawing, FIG. 1 shows the application of rotary suspension actuators to a typical tracked vehicle 11. In this side view it will be apparent that only one of each pair of actuators is illustrated. The actuators located at wheel positions A, B and E and their opposite counterparts are complete rotary suspension actuators with shock absorbers, while the actuators located at wheel positions C and D solely for practical reasons, are rotary actuators without shock absorbers. Each of these types will be described in detail hereinafter. Selection of units with shock absorbers is dependent on vehicle requirements, i.e. more or less than three pairs with shock absorbers may be used. The actuators 10 are mounted on one end to the vehicle 11 and on the other end to the road arm and wheel assembly item 12, shown in greater detail in FIG. 2. The wheel engages the track 13 which is conventional on vehicles of a kind employed for off-highway use. The track 13 is suitably driven as by drive pinion 14 and supported by idler pinion 15 and track rollers 16.

Figures 2, 4:
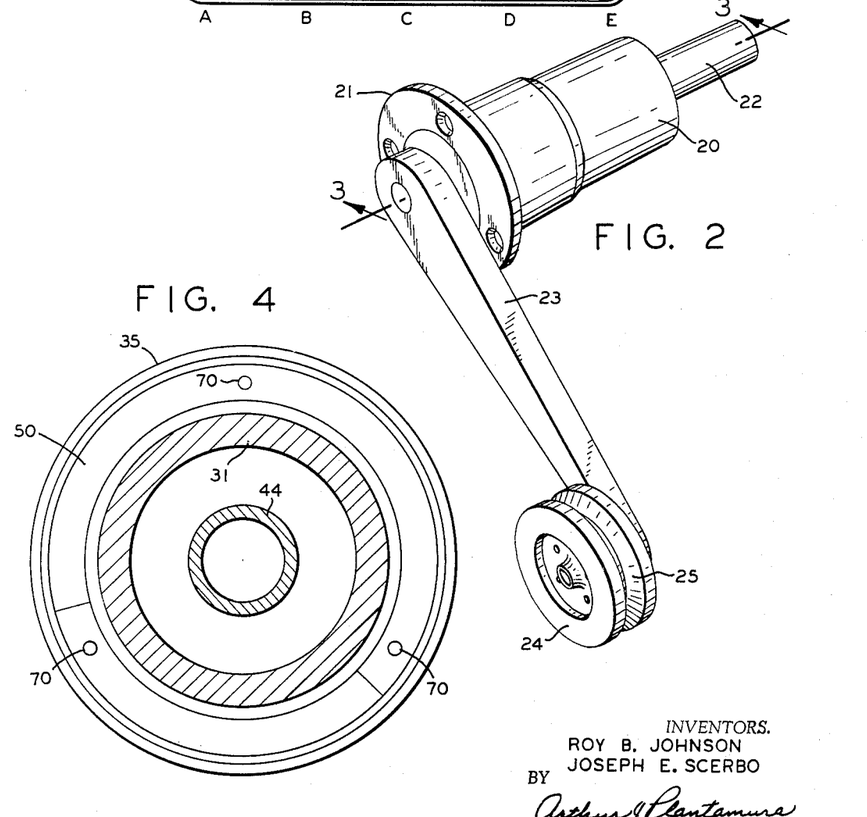
FIG. 2 is an enlarged diagram further illustrating the actuator and its connection on one side to the road arm and on the other side to the torsion bar.
FIG. 4 is an end view of the actuator of FIG. 3 taken substantially along line 4—4 of FIG. 3.

In FIG. 2 the rotary suspension actuator 20 with a suitable mounting flange 21 for convenient attachment to the vehicle 11 is depicted. The inboard connection to the vehicle may be through any suitable means such as torsion bar 22 which comprises spline or other suitable means and which for purpose of clearer disclosure is shown as a part of FIG. 2. The actuator 20 is suitably connected on the outboard end to a road arm 23 which terminates at the road wheel 24. The road wheel when used in conjunction with track vehicles is suitably contoured as at 25 to accommodate the track 13. Rotary actuators which are not equipped with shock absorbers are attached to the vehicle 11 in the same manner as the rotary suspension actuator which contains a shock absorber. The rotary actuator elements in both units are essentially the same. The discussion herein will focus primarily on the actuator with shock absorbers but it will be understood that the unit without shock absorbers functions similarly with respect to rotational capability. The rotary actuator per se is disclosed and claimed in a copending U.S. Patent application S.N. 325,572, filed on November 22, 1963.

Figure 3:
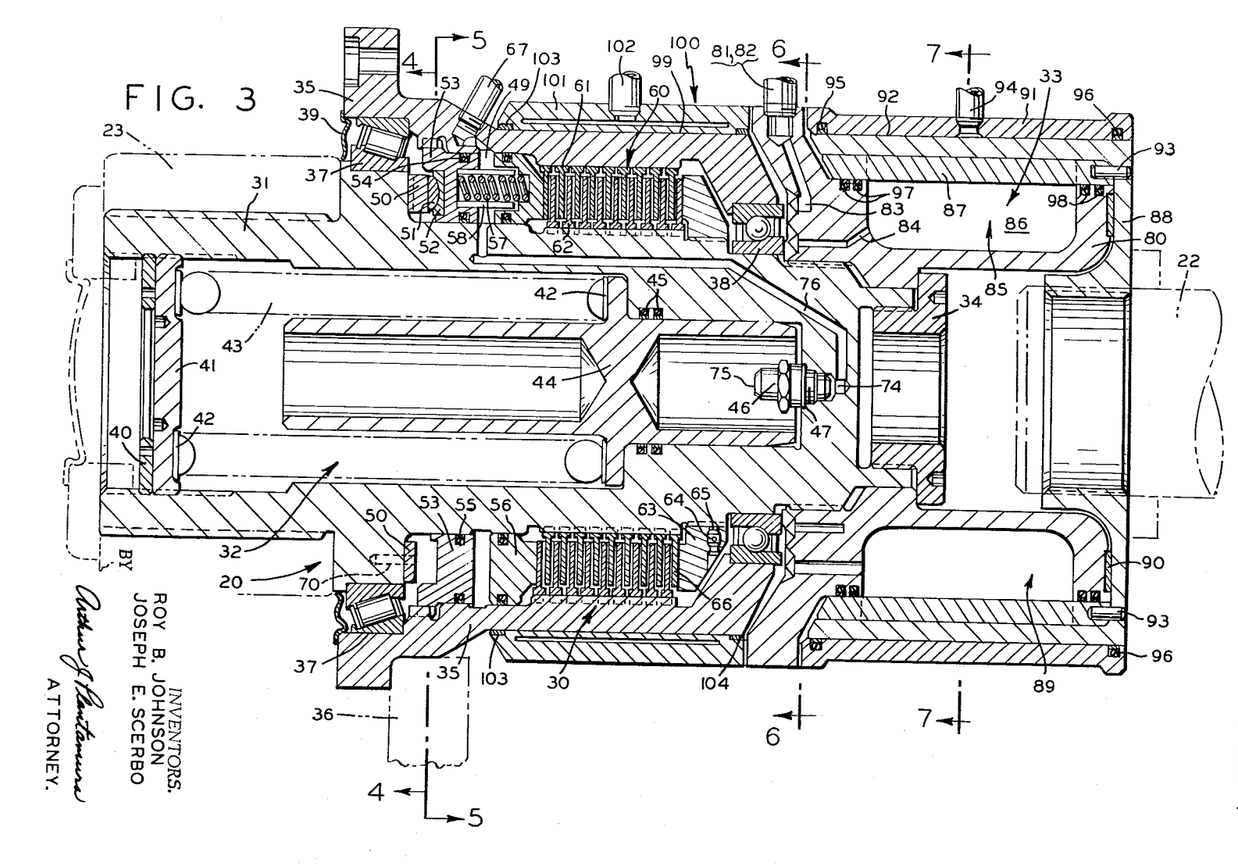
FIG. 3 is a side elevational view in section taken substantially along line 3—3 of FIG. 2 illustrating a preferred embodiment of the actuator of the invention.

Referring now to FIG. 3, the general arrangement of the preferred embodiment of the rotary suspension actuator 20 is illustrated in greater detail. The actuator 20 includes three main components: the shock absorber assembly 30, the rotary actuator 33 and the suspension lock out unit 100. The shock absorber assembly 30 incorporating the shaft 31 is connected, as by a spline, to the road arm 23 on one end and likewise may be splined on the other end to the rotary actuator assembly 33 and thereafter suitably secured as by lock nut 34.

The main housing 35 is bolted to the hull 36 of the vehicle 11. Between the main housing 35 and the main shaft 31 are the outer and inner bearings 37 and 38 of any suitable configuration. These bearings support the main shaft 31 and permit rotation thereof with respect to the main housing 35. Also, radial and thrust loads are carried to the vehicle hull 36 through thse bearings. A protective shield 39 is provided for the outer bearing 37.

Located within the main shaft 31 is a hydromechanical accumulator assembly 32 which functions to pressure load the friction disks 60 and control the action of the shock absorption which is discussed in greater detail hereinafter. The assembly 32 comprises spring 43, spring retainer 41, spring retainer lock nut 40, spring thrust plates 42, accumulator piston 44 and seals 45. The spring preload is externally adjustable through the spring retainer 41. Spring preload is adjusted by rotating the spring retainer 41 clockwise or counterclockwise as rquired to produce proper compression of the spring. A velocity control orifice 46 and seal 47 are screwed into the main shaft 31. The velocity control orifice 46 is preferably of the self-cleaning type equipped with filters in both inlet and outlet ports 74 and 75. The inlet port 74 is connected to the shock absorber hydraulic chamber 49 by way of passage 76.

Within the hydraulic chamber 49 are the control cam 50, cam shoes 51 and shoe seats 52. The shoe seat 52 is pressed into the cam piston 53 which contains seals 54 and 55. The disc piston 56 is preloaded with a plurality of springs 57, three springs being shown spaced at 120 degree intervals. To prevent piston 53 from rotating with respect to piston 56, sleeves 58 are employed. These sleeves 58 also act as guides for springs 57.

The disk piston 56 applies a force to the disk stack 60 causing the stationary disk 61 to contact the rotary disc 62. The stationary disk 61 is splined to the main housing 35 and the rotary disk 62 is splined to the main shaft 31. The disk stack 60 is retained by the nut 63 and is locked to the main shaft 31 by the set screw 64. A nylon cushion pellet 65 may be employed to prevent marring of the thread on the main shaft 31. The nut 63 contacts the first disk 66 which is splined to the main shaft 31 and since the nut is threaded to the same shaft, there is no relative motion between the two elements 66 and 63.

Due to high torque loads which may be applied by the friction disks 60 and the constant load reversal that will be imposed by the road arm 23, it is preferred that the spline length of the discs be increased above that normally furnished in commercially available units. Accordingly, the disks have a spline length that is substantially twice the disk thickness. A shock absorber hydraulic port 67 is provided to permit preload pressurization of the hydraulic chamber 49 and, in turn, the disk stacks 60. This port also provides a means for supplying make-up fluid for any losses in the shock absorber hydraulic system.

The shock absorber of the invention incorporates the three controls enumerated above and affords the operator means to vary the ride hardness based on the terrain. This flexibility is attained by varying static pressure in the hydraulic chamber of the shock absorber and this directly varies the damping torque provided by a plurality of friction disks. Velocity control in the shock absorber fluid system is accomplished by increasing the pressure on the friction disks as a function of hydraulic flow rate through a fixed orifice and displacement control is provided by cams and hydraulic pistons working in combination with a hydro-mechanical accumulator. As the road arm is compressed, fluid is displaced into the accumulator, raising the pressure, thus increasing the damping torque of the friction disks. Due to the nature of the system and the needs thereof, it will be apparent that at low arm angular velocities, the velocity control effect of the orifice approaches a minimum.

A typical operation of the shock absorber is as follows: when the vehicle is traveling, the oscillating road arm rotates the main shaft. The cam drive on the main shaft is in contact with the cam shoes on the piston; thus the piston translates with angular motion of the road arm. The volume of fluid displaced varies directly as the compression of the road arm, and the rate of fluid displacement varies directly as the road arm angular velocity. The fixed orifice between the hydraulic chamber and the hydro-mechanical accumulator provides velocity control by causing pressure in the chamber to rise as a function of the rate of fluid flow. The faster the road-wheel compression, the quicker the damping torques increase, up to lock out. With very slow road arm compression, a low flow rate through the orifice results in a lower pressure drop and allows greater road arm travel to take place with lockout not accomplished until maximum road arm travel is reached.

The vehicle driver can set the ride hardness he chooses for each individual wheel or track by maintaining individually selected static pressure on the friction discs. Thus, any limit on the amplitude of individual wheel travel from full 88° of road arm travel to full lockout is possible.

As noted, the actuator assembly 33 is mounted to the main shaft 31 which is splined to the road arm 23 on one end and the actuator on the other. A nut 34 locks the main shaft 31 to the rotor housing 80. The rotor housing 80 contains ports 81 and 82 and passages 83 and 84 which transmit fluid to the vane chambers 85 and 89. The vanes 86 are inserted into the vane retaining ring 87 with seals 97 and 98 which prevent the vane chambers from communicating with each other. The stator housing 88 is fastened to the vane retainer ring 87 by pins 93. A thrust washer 90 is located between the rotor housing 80 and the stator housing 88. The outer diameter of the stator housing 88 is used as the locking surface for the interference fit bearing lock sleeve 91 which is keyed or otherwise secured to the rotor housing 80. This allows for torque to be transmitted from the rotor housing 80 to the interference fit bearing lock sleeve 91 then across the lock surface 92 to the stator housing 88 and torsion bar 22. When the lock 91 is released by introducing pressure at port 94, the rotor housing 80 can be rotated with respect to the stator housing 88.

Seals 95 and 96 seal the interference fit bearing lock fluid chamber 92 when pressure is applied to the port 94 to unlock the interference fit at 92.

A suspension lockout assembly 100 is provided for mechanically connecting the road arm 23 directly to the vehicle hull 36 to provide a relatively rigid platform as, for example, when the vehicle is not traveling. When positioned stationary in this manner, it may function, e.g. for gun sighting and firing without contending with swaying and rebound occurring with shock cushioning systems.

As illustrated in FIG. 3, a pressure applied lock 101 is used to accomplish the suspension lockout function at the interface 99 between the outside surface of main housing 35 and the inner surface of locking sleeve 101. The lock at 101 functions to grip when hydraulic pressure is applied at the suspension lockout port 102.

When the vehicle is traveling the lockout assembly 100 is depressurized thereby providing radial clearance at interface 99 to allow the suspension lockout assembly 100 to oscillate freely around the main housing 35. Bronze bearing rings of suitable type 103 and 104 are provided at each end of the lock 101 to align and support the assembly 100. The locking feature of this assembly functions in a manner essentially in reverse to the locking sleeve 91 on the rotary actuator 33 which is released by pressurization. A pressure applied lock for suspension lockout, i.e. inactivation of the shock absorber by affirmatively introducing pressure is proposed to assure that a failure in the hydraulic system would not inadvertently or accidently lock out the suspension system. This is desired, for example, because accidental or malfunction application of the lock at 99 when the vehicle is traveling would render the suspension system inoperable and possibly disable the vehicle.

When the vehicle is at rest and suspension lockout is required, the operator merely applies hydraulic pressure to the assembly through port 102 thereby engaging the lock at interface 99. The locking characteristics for a pressure applied lock 99 are in general similar to those for a pressure released type as at 91. Depending on the application and, for example, on the relative periods of use of the lock at 99 it will be understood that this lock may comprise instead a pressure releasable type as that at 91. When this latter kind is used the interference fit structure would function to unlock by applying pressure.

Referring to FIG. 4, means for securing and positioning the control cam 50 to the main shaft 31 by locating dowels 70 is illustrated. These dowels are concentrically disposed with respect to and radially outside of the main shaft 31, accumulator piston 44, and inside the stationary housing 35.

Figure 5:
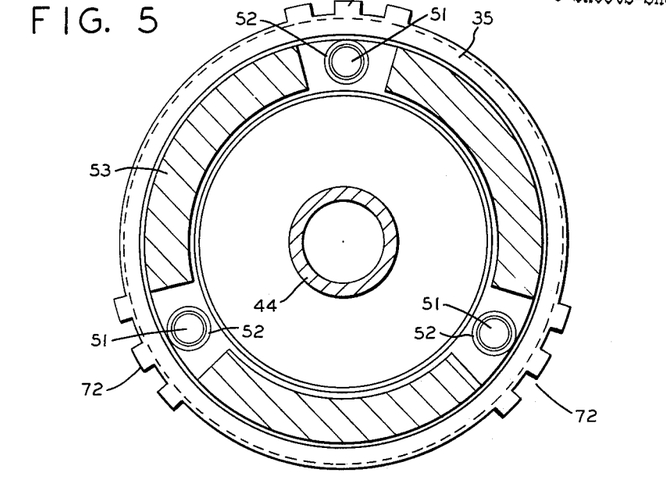
FIG. 5 is an end view of the actuator of FIG. 3 taken substantially along line 5—5 of FIG. 3.

Illustrated in FIG. 5 are the cam shoes 51, cam shoe seats 52, cam piston 53, stationary housing 35 with cam piston assembly key segments 72 and accumulator piston 44 each of which is described hereinabove in connection with FIG. 3.

Figure 6:
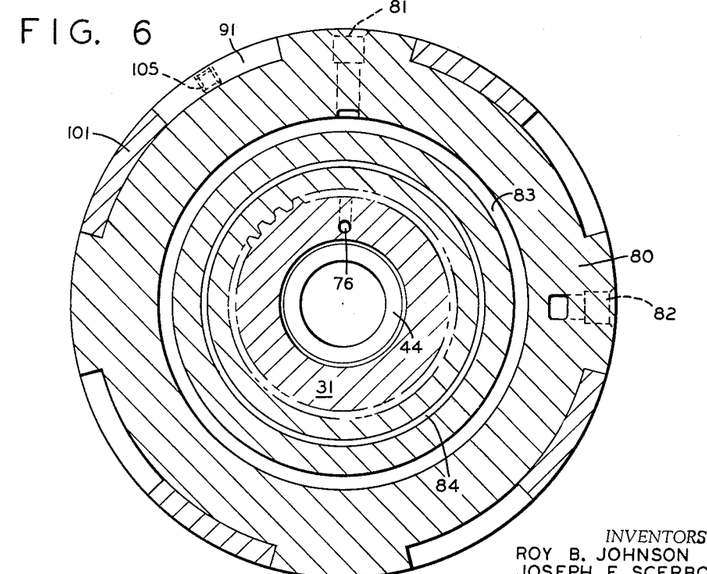
FIG. 6 is an end view of the actuator of FIG. 3 taken substantially along line 6—6 of FIG. 3.
Figure 7:
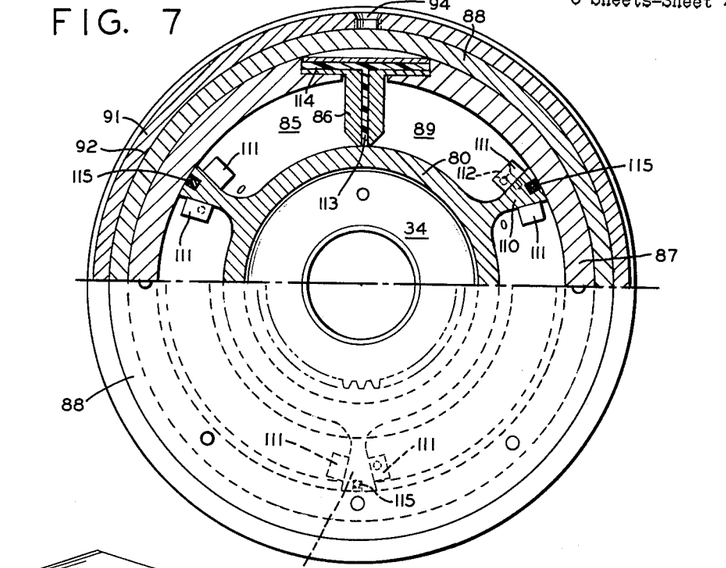
FIG. 7 is an end view of the actuator of FIG. 3 taken substantially along line 7—7 of FIG. 3.

The relationship shown in FIG. 6 is the main shaft 31 in which is contained the accumulator piston 44 both of which are centrally located with respect to the rotor housing 80 and the interference fit locking units 91 and 101. Also shown in this view is the interlocking arrangement comprising interfitting segments which are formed as part of elements 80, 91 and 101 and which impart rigidity to the overall assembly. The locking sleeves 91 and 101 and the rotor housing 80 are locked together by set screw 105. This figure also shows the rotary actuator ports 81 and 82 and the associated passages 83 and 84. The interior of the rotary actuator is illustrated by FIG. 7. Also shown is the rotor housing 80 which comprises the rotary vanes 110 to which stop pads 111 are fastened by screws 112. The pads 111 limit the angular travel and provide a cushioned limit for the rotary vanes 110. The stationary vanes 86 are located inside the stator housing 88 and are suitably secured in place as by the vane retaining ring 87. Seals 113 and 114 seal the stationary vanes 86 with respect to the housing 80 to prevent cross vane leakage. Seals 115 perform the same function for the rotary vanes 110.

The interference fit lock 91 is concentrically located with respect to the stator housing 88 and is released by applying pressure at the unlock port 94. To operate the rotary actuator, the lock 91 is released at the interface surface 92 by applying pressure at port 94 and to rotate pressure is applied to either vane chamber 85 or 89 depending on the direction of rotation desired. When the desired position of rotation is achieved the pressure is vented and the lock 91 is reapplied at any one of an infinite number of angular positions.

Figure 8:
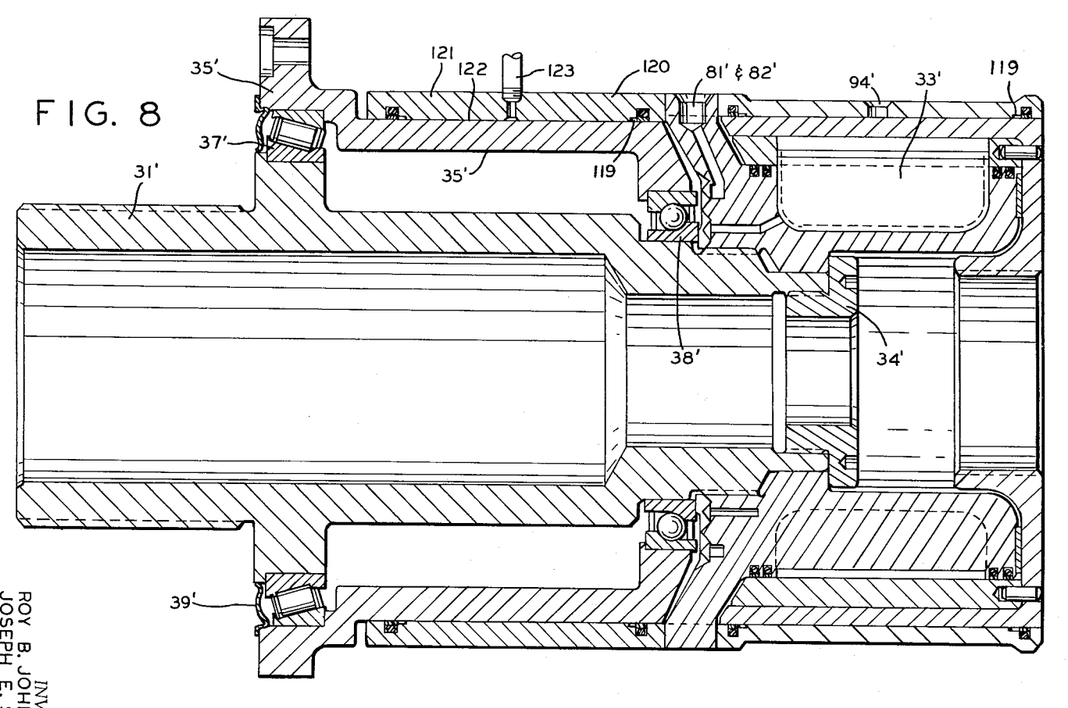
FIG. 8 is a side elevational view in section similar to FIG. 3 illustrating an alternate embodiment.

The embodiment of FIG. 8 comprises an alternate arrangement wherein numerals designated by prime (′) indicate like parts as those used in FIG. 3, while parts which differ are designated by different reference numerals. As shown therein, the arrangement includes the main shaft 31′ located concentrically within the main housing 35′ and supported by two bearings 37′ and 38′ which enable the main shaft to take both radial and thrust loads. A protective shield 39′ is provided outside bearing 37′. The rotary actuator 33′ is splined to the main shaft 31′ and retained by lock nut 34′. As described previously in FIG. 3, port 95′ is used to release the locking sleeve while ports 81′ and 82′ are used for rotating the actuator 33′, by the introduction of fluid pressure therein, in either a clockwise or counterclockwise direction. The rotary actuator as described thus far in connection with FIG. 8 is substantially similar to the rotary actuator disclosed in the earlier mentioned application S.N. 325,572 and as such may be used at wheel positions C and D. The actuator may further be equipped with provisions for suspension lockout and as shown in FIG. 8, a suspension lockout unit 120 of the release by pressurizing type is illustrated. The lock comprises an outer sleeve 121 which forms effectively an interference fit on the outside diameter of the main housing 35′. Because this unit is of the pressure release variety, to unlock the interference fit, hydraulic pressure is applied to port 123 thereby uncoupling or disengaging the interference fit at the interface surface 122. Upon release of the interference fit, the suspension lockout unit 120 is permitted to oscillate freely around the main housing 35′. Annular space 119 functions to enhance uniformly rapid fluid pressure introduction at the interface 122.

Figure 9:
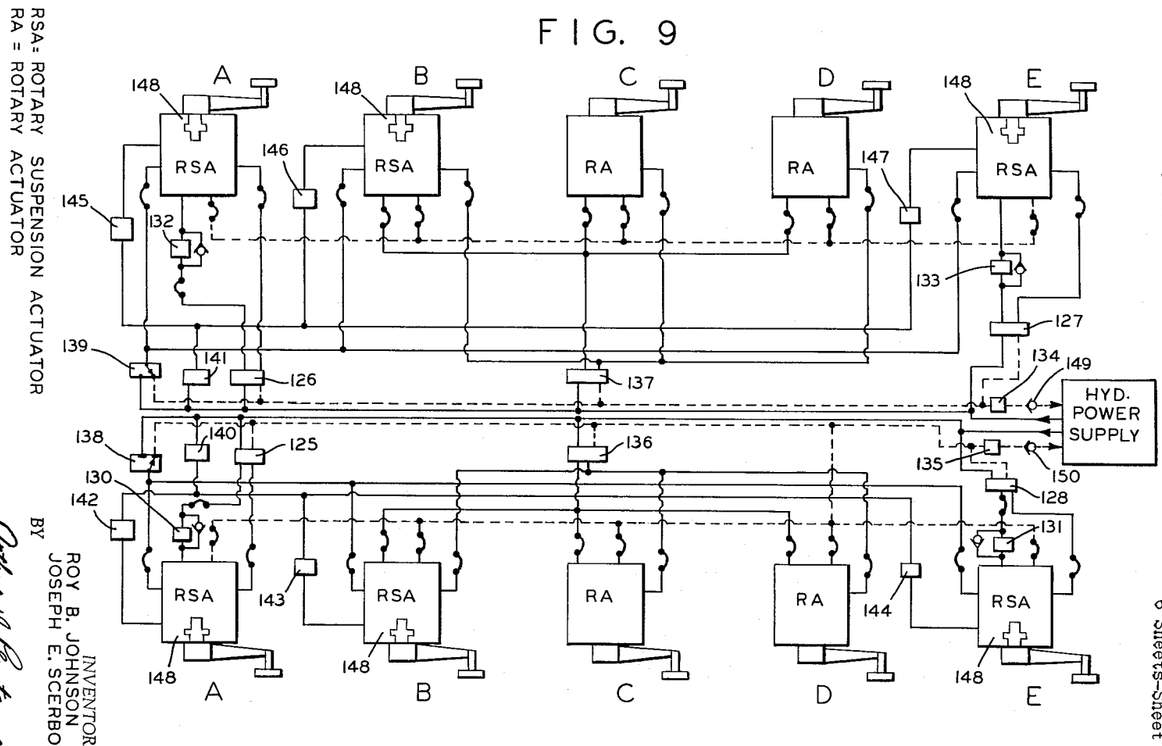
FIG. 9 is a schematic diagram of a system which may be used to control the operation of a system of actuators of the invention.

A specimen control system for the vehicle suspension system of the invention is described in conjunction with the schematic diagram of FIG. 9. It will be apparent however that the arrangement described represents only one of a number of practical systems, which may be employed to coordinately control the various components. In essence the system of FIG. 9 comprises an arrangement of manual and electrohydraulic control valves employed in a manner to provide the vehicle with the desired control characteristics and preferably has the following capabilities:

(1) To raise and lower the entire vehicle (88° road arm rotation) to provide varying ground clearance and vehicle silhouette;
(2) To raise or lower either side of the vehicle independently;
(3) To raise or lower the front of the vehicle;
(4) To raise or lower the rear of the vehicle;
(5) To level the vehicle;
(6) To apply and release the suspension lockout;
(7) To harden or soften the vehicle ride by hydraulically adjusting the preload torque in the rotary friction hydraulic shock absorbers;
(8) To rapidly control the speed at which the vehicle is raised or lowered, i.e. full stroke is attainable in about 7 seconds; and
(9) To provide overload protection for the hydraulic section of the friction hydraulic shock absorber.

Referring to FIG. 9 a solenoid operated, 4-way; 3-position directional valve, 125, 126, 127 and 128 with a manual override is provided for each of the rotary suspension actuators in the four corners of the vehicle, i.e. actuators A and E, on both sides of the vehicle, see FIG. 1. These four directional valves operating in conjunction with pressure compensated flow control valves 130, 131, 132 and 133 which control the speed for raising the vehicle and are of the meter-in control type. For lowering the vehicle the direction valves 125 through 128 work in combination with the two return line pressure compensated flow control valves 134 and 135 which are of the meter-out control type.

Two directional valves 136 and 137 are provided; one valve for operating each set of the middle three actuators B, C and D on each side of the vehicle. When lifting the entire vehicle, or one side of the vehicle, the corner actuators control the rate of movement, and the middle actuators are mechanically synchronized with the corner actuators by the structural rigidity of the vehicle hull 36. This control technique insures that each actuator is taking its share of the load. The interference fit lock unit which locks the rotary actuator is automatically released when the directional valves 125, 126, 127, 128, 136 and 137 are energized. When these valves are energized, one valve port releases the lock and when the valve is de-energized, it applies the lock.

To raise the front of the vehicle, the front and center wheel position directional valves 125, 126, 136 and 137 would be energized, while the rear corner valves would remain de-energized. This sequence would raise the front of the vehicle with wheel position E acting as a pivot. To raise the rear of the vehicle the sequence would simply be reversed using wheel position A as the pivot. To lower either the front or the back of the vehicle, the directional valves 125, 126, 136 and 137 would be actuated in the opposite direction. Leveling the vehicle is accomplished by operating the actuators in the required sequence for placing both the transverse and longitudinal axis of the vehicle in a horizontal plane.

A three-way double solenoid detent valve 138, 139 is provided for each side of the vehicle to apply the suspension lockout. This lock must be released when the vehicle is moving or when the rotary actuators are being operated.

The proposed control system provides two manual pressure reducing valves 140 and 141, one for the rotary friction hydraulic shock absorbers on each side of the vehicle. These valves permit the operator to vary the hydraulic preload on the shock absorber friction discs thereby equipping the vehicle with a spectrum of ride characteristics ranging from soft to hard. These valves 140 and 141 also provide a continuous source of make-up fluid for the hydraulic actuating chamber within the shock absorbers. Located at each rotary friction hydraulic shock absorber is a solenoid operated shut-off valve 142, 143, 144, 145, 146 and 147 and when it is in the closed position an integral check valve by-pass and overload relief element are provided. These valves are required to isolate the unit from the upstream side of the hydraulic system so that a trapped volume of fluid is contained within the hydraulic chamber of the shock absorber. The check valve is used to provide for make-up fluid. A relief element is provided within the shut-off valve to prevent over pressurization of the shock absorber if the hydro-mechanical accumulator bottoms, i.e. if full compression of spring results. A solenoid operated type valve is employed because this functions to permit positioning of the valve near the actuator without having to run extra pilot lines or control cables.

The hydro-mechanical accumulator 148 is provided as an integral part of the rotary suspension actuator. This accumulator as shown in FIG. 3 is located in the center of the main shaft and is connected by means of drilled passages to the hydraulic chamber of the shock absorber. This accumulator working in combination with a control orifice provides the shock absorber with road arm displacement and velocity control capability. The elements shown as 149 and 150 in FIG. 9 are simply back pressure control valves which maintain a positive head in the return line at all times. This will insure that air will not enter the system when it is inactive.

Figure 10:
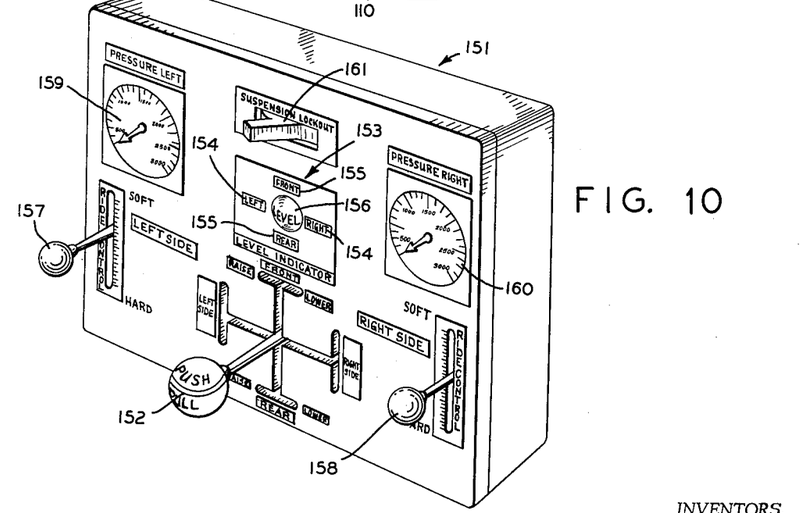
FIG. 10 is a schematic diagram to depict one form of control panel which may be used to coordinate the component elements of the invention.

The system may be adapted for fully automatic operation but is in general semi-automatically operated. For this purpose an operator's control panel 151 as illustrated in FIG. 10, may be provided and, for example, may be installed in the vehicle control cab. A single position control lever 152 of conventional design may be used to permit the operator to position the vehicle in any desired attitude, as well as providing the means for leveling in combination with conventional electrical level sensors installed in the vehicle, with readout provisions 153 on the control panel. One pair of panel lights 154, for example, may be used to indicate transverse out-of-levelness and another pair 155 longitudinal out-of-levelness and a center light 156 in the display may be arranged to illuminate when the vehicle is level thereby indicating to the operator which corner or side must be raised to achieve levelness.

In addition to vehicle position control, the operator's panel may also be equipped with levers 157 and 158 which control the preload pressure in the shock absorbers on each side of the vehicle. These levers control the manual pressure reducing valves 140 and 141. The panel is also provided with suitable left and right pressure readout indicators 159 and 160 and a two-position switch 161 to activate and deactivate the suspension system.

It will be apparent to those skilled in the art that various modifications may be made in the invention without departing from the scope of the invention. Accordingly, the invention is not to be limited except insofar as necessitated by the appended claims.

We claim:
1. An actuator-coupling device for controlled transmission of rotational forces, comprising:
   housing means adapted for connection against rotation;
   rotor means rotatably supported by the housing means, and having connecting means at each of its two ends to form a rotatable couple thereby and motor means for rotating the connecting means relative to one another;
   the housing and rotor means each having an annular wall operatively cooperating with the wall of the other to provide a pair of adjacent surfaces concentric at least in part forming a rotor means lock-out;
   the rotor means lock-out being selectively responsive to pressure fluid for providing clearance at the in- terface between the adjacent surfaces to permit rotation of the rotor means and for providing an interference fit at the interface to interlock the rotor means against rotation to the housing means;

the motor means having a pair of operatively cooperating annular walls to provide a pair of adjacent surfaces concentric at least in part forming a motor means lock-out; and the motor means lock-out being selectively responsive to pressure fluid for providing clearance at the interface between the adjacent surfaces to permit the motor means to rotate the connecting means relative to one another and for providing an interference fit to prevent the motor means from rotating the connecting means.

2. The actuator-coupling device in accordance with claim 1, wherein:

at least one lock-out has means for providing pressure fluid between the pair of annular walls for acting on the pair of adjacent surfaces to provide a clearance at the interface.

3. The actuator-coupling device in accordance with claim 1, wherein:

at least one lock-out has means for providing pressure fluid to at least one of the annular walls acting on the side of the surface thereof opposite from the other of the walls to provide an interference fit at the interface.

4. The actuator-coupling device in accordance with claim 1, further comprising:

friction means operatively associated with the housing and rotor means for frictionally resisting rotation of the rotor means when the friction means is actuated; and means for actuating the friction means in response to the speed of rotation of the rotor means for increasing resistance by the friction means as the speed of rotation increases.

5. The actuator-coupling device in accordance with claim 1, further comprising:

friction means operatively associated with the housing and rotor means for frictionally resisting rotation of the rotor means when the friction means is actuated; and means for actuating the friction means in response to angular displacement of the rotor means as it rotates for increasing resistance by the friction means as the angular displacement increases.

6. The actuator-coupling device in accordance with claim 5, further comprising:

means for actuating the friction means in response to the speed of rotation of the rotor means for increasing resistance by the friction means as the speed of rotation increases.

7. The actuator-coupling device in accordance with claim 6, further comprising:

means for providing a static force acting on the friction means for preloading and being adjustable for varying the static force.

8. An actuator-coupling device for controlled transmission of rotational forces, comprising:

a housing having an annular wall and being adapted for connection against rotation;

a shaft rotatably supported by the housing and having an annular wall encircling the annular housing wall;

the annular housing and shaft walls providing a pair of adjacent surfaces concentric at least in part forming a lock-out selectively responsive to pressure fluid for providing a clearance at the interface between the adjacent surfaces to permit the shaft to rotate and for providing an interference fit at the interface to interlock the shaft against rotation to the housing;

a motor having a pair of members connected to each other for relative rotation in response to pressure fluid;

one of the motor members and the shaft at one end thereof each having connecting means, and the shaft being connected at its other end to the other of the motor member for rotation in unison to provide a rotatable couple with connecting means at its ends which are rotatably relative to each other by the motor; and each of the motor members having an annular wall together providing a pair of adjacent surfaces concentric at least in part forming a lock-out selectively responsive to pressure fluid for providing a clearance at the interface between the adjacent surfaces to permit relative rotation of the motor members and for providing an interference fit at the interface to interlock the motor members together against relative rotation.

9. The actuator-coupling device in accordance with claim 8, further comprising:

an annulus formed between the shaft and the annular housing wall encircling the shaft in spaced relation thereto;

a plurality of friction rings disposed in the annulus connected in alternate series to the housing and shaft and being movable axially relative thereto and into progressively intimate contact to progressively resist rotation of the shaft;

actuating means disposed in the annulus and responsive to rotation of the shaft to progressively urge the friction means into intimate contact with each other as the shaft progressively rotates.

10. The actuator-coupling device in accordance with claim 9, the actuating means comprising:

a pair of spaced pistons defining a chamber therebetween having an inlet to receive pressure fluid;

one of the pistons being cammed toward the other by rotation of the shaft and tending to reduce the area of the chamber and increase the pressure of the pressure fluid therein; and the other of the pistons being responsive to the pressure fluid in the chamber and urging the rings into intimate contact.

11. The actuator-coupling device in accordance with claim 10, further comprising:

a pressure chamber disposed axially in the shaft and connected at one end to the chamber defined between the spaced pistons;

a piston disposed in the chamber biased toward the connected chamber end and being movable against the bias by pressure fluid as the cammed piston is being urged by rotation of the shaft.

12. The actuator-coupling in accordance with claim 11, further comprising:

a restricted orifice connecting the pressure chamber to the chamber defined between the spaced pistons.

References Cited by the Examiner

UNITED STATES PATENTS

| 1,921,951 | 8/1933 | Simon et al. | 188—130 |
| 2,902,288 | 9/1959 | Dill | 280—43.23 |
| 3,047,283 | 7/1962 | Kivell | 188—120 X |
| 3,117,800 | 1/1964 | Magnuson. | |
| 3,126,910 | 3/1964 | Reed | 188—89 X |

FOREIGN PATENTS

| 1,081,361 | 6/1954 | France. |

DUANE A. REGER, *Primary Examiner.*

MILTON BUCHLER, *Examiner.*